(No Model.)
E. F. W. NEBHUTH.
POULTRY COOP.
No. 303,396. Patented Aug. 12, 1884.
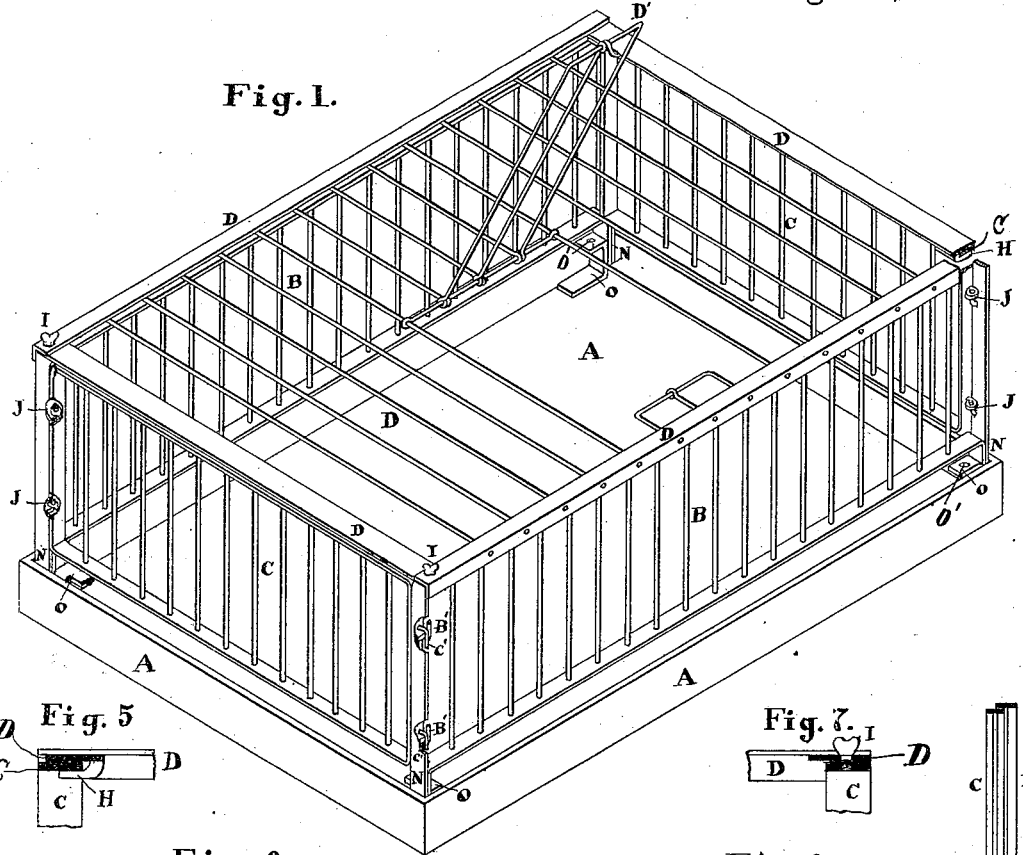
Fig. 1.
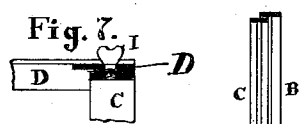
Fig. 5.
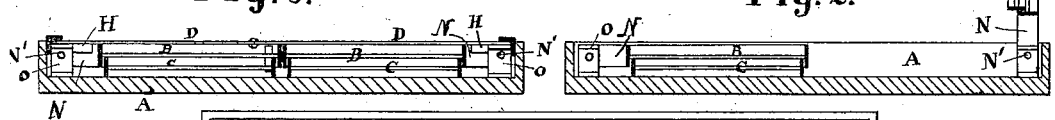
Fig. 3. Fig. 2.
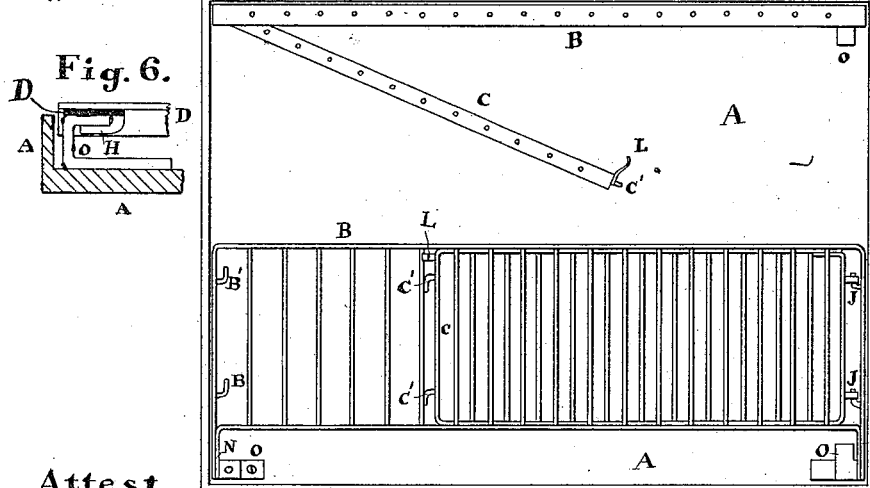
Fig. 6. Fig. 8.
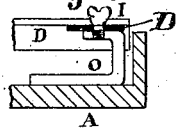
Fig. 9.
Fig. 4.
Attest:
N. W. Perkins Jr.
Geo. L. Wheelock
Inventor:
Edward F. W. Nebhuth
By Knight Bros.
Attys
N. PETERS. Photo-Lithographer, Washington, D. C.

UNITED STATES PATENT OFFICE.

EDWARD F. W. NEBHUTH, OF ST. LOUIS, MISSOURI.

POULTRY-COOP.

SPECIFICATION forming part of Letters Patent No. 303,396, dated August 12, 1884.

Application filed May 17, 1884. (No model.)

*To all whom it may concern:*

Be it known that I, EDWARD F. W. NEBHUTH, of the city of St. Louis, in the State of Missouri, have invented a certain new and useful Improvement in Poultry-Coops, of which the following is a full, clear, and exact description, reference being had to the accompanying drawings, forming part of this specification, and in which—

Figure 1 is a perspective view with the door raised or opened. Fig. 2 is a transverse section with the ends folded against the sides and one of the sides folded down. Fig. 3 is a similar view with both sides folded down. Fig. 4 is a top view, one of the ends being folded against the side to which it is hinged and the side folded down, and the other end being partly folded, the side to which it is hinged being in its upright position. Figs. 5, 6, 7, 8, and 9 are enlarged detail views hereinafter referred to.

My invention relates to that class of coops that can be folded when not in use; and my invention consists in features of novelty pointed out in the claims.

Referring to the drawings, A represents the bottom of the coop, made preferably of wood; B, the sides; C, the ends, and D the top. The sides and ends consist of rectangular frames having bars or rods, as shown, and the top consists of a rectangular frame and bars or rods, (the sides of the top consisting preferably of angle-bars.) The top has a suitable door, D', as shown in Fig. 1. The sides, ends, and top are all preferably made of metal. The top is held in place, when the coop is in using position, by hooks H, secured to one of its ends, which, by moving the top endwise, engage beneath the top part or bar of one of the ends, as shown in Figs. 1 and 5, and by screws I, which fasten the other end of the top to the sides or other end of the coop. By removing the screws I the top can be pulled back, disengaging the hooks H from the end of the coop, and thus the top can be taken off. The ends, as shown at J, Figs. 1 and 4, are hinged to the sides—one end to each side—as shown, so that when the coop is to be put into shipping position they (the ends) can be folded back against the sides, as shown in Figs. 2, 3, and 4, where they are held by hooks L, that engage one of the bars or rods of the sides, as shown in Figs. 4 and 9, and thus the ends will not swing out of themselves from the sides, but will be held until pulled out by force. When the coop is in using position, the free ends of the end pieces are connected to the other side pieces from those to which they are hinged by hooks B' and C', secured, respectively, to the sides and ends which interlock, as shown in Fig. 1, and by simply lifting up on the end pieces the hook will be disengaged. The ends of the sides have extensions N, which are hinged by rivets or pins N' to brackets O, made fast to the bottom of the coop, and thus when the ends are folded, as described, the sides can be folded down upon the bottom, as shown in Figs. 2, 3, and 4, where they are held by the top being placed over them, as shown in Fig. 3, it being held there by the hooks H engaging beneath two of the brackets O, (see Fig. 6,) and by the screws I fitting in holes O' in the other brackets O. (See Fig. 8.)

The coop can be quickly and easily changed from a using to a shipping position, and vice versa.

The hooks H may, it is obvious, be secured to the ends instead of the top, and then they would engage the top instead of the end.

I claim as my invention—

1. In a folding poultry-coop, the combination of the bottom provided with brackets, sides having projections hinged to the brackets and provided with hooks, ends hinged to the sides and having hooks to engage the hooks on the sides, and the top held in place by hooks and screws, substantially as set forth.

2. In a folding poultry-coop, the combination of the bottom, brackets secured to the bottom, sides hinged to the brackets, ends hinged to the sides, hooks on the sides and ends to hold the ends in using position, hooks on the ends to hold them folded against the sides, top, hooks on the top adapted to engage one end of the coop when in using position and the brackets at one end of the coop when in shipping position, and the screws for holding the other end of the top in place in either position, substantially as set forth.

EDWARD F. W. NEBHUTH.

Witnesses:
SAML. KNIGHT,
GEO. H. KNIGHT.